(12) United States Patent
Fabijancic et al.

(10) Patent No.: US 9,639,538 B2
(45) Date of Patent: May 2, 2017

(54) EMBEDDING ARCHIVED DATA IN A DATA SOURCE

(71) Applicant: SAP SE, Walldorf (DE)

(72) Inventors: Toni Fabijancic, Eppelheim (DE); Axel Herbst, Eppingen-Rohrbach (DE); Jan Nolte-Boemelburg, Bad Schonborn (DE); Mathias Roeher, Helmstadt-Bargen (DE)

(73) Assignee: SAP SE, Walldorf (DE)

( * ) Notice: Subject to any disclaimer, the term of this patent is extended or adjusted under 35 U.S.C. 154(b) by 151 days.

(21) Appl. No.: 13/930,581

(22) Filed: Jun. 28, 2013

(65) Prior Publication Data
US 2015/0006489 A1 Jan. 1, 2015

(51) Int. Cl.
*G06F 17/30* (2006.01)
*G06F 11/14* (2006.01)

(52) U.S. Cl.
CPC .. *G06F 17/30073* (2013.01); *G06F 17/30312* (2013.01); *G06F 11/1451* (2013.01)

(58) Field of Classification Search
CPC .......... G06F 17/30073; G06F 11/1451; G06F 17/30312
See application file for complete search history.

(56) References Cited

U.S. PATENT DOCUMENTS

| | | | |
|---|---|---|---|
| 6,490,597 B1 | 12/2002 | Singh et al. | |
| 7,185,024 B2 | 2/2007 | Zhou et al. | |
| 7,853,568 B2 * | 12/2010 | Mukhi | 707/661 |
| 7,873,603 B2 * | 1/2011 | McElroy et al. | 707/668 |
| 7,904,726 B2 | 3/2011 | Elgezabal | |
| 7,937,410 B2 | 5/2011 | Steinmaier et al. | |
| 8,010,695 B2 | 8/2011 | Savchenko et al. | |
| 8,032,494 B2 | 10/2011 | Aalmink | |
| 8,132,013 B2 | 3/2012 | Meier | |
| 8,140,573 B2 | 3/2012 | McKay et al. | |
| 8,271,452 B2 | 9/2012 | Longshaw | |
| 8,407,706 B2 | 3/2013 | Gerwens et al. | |
| 8,429,364 B1 | 4/2013 | Orcutt | |
| 8,788,464 B1 * | 7/2014 | Lola et al. | 707/667 |
| 2005/0235140 A1 | 10/2005 | Hui et al. | |
| 2005/0278639 A1 | 12/2005 | Becker | |
| 2006/0206507 A1 * | 9/2006 | Dahbour | G06F 17/30604 |
| 2012/0030180 A1 * | 2/2012 | Klevenz et al. | 707/661 |
| 2013/0036115 A1 | 2/2013 | Schwarz et al. | |
| 2014/0074832 A1 * | 3/2014 | Chitiveli | G06F 17/30079 707/736 |

* cited by examiner

*Primary Examiner* — Robert Beausoliel, Jr.
*Assistant Examiner* — Arthur Ganger
(74) *Attorney, Agent, or Firm* — Jones Day

(57) ABSTRACT

Archiving may be integrated into an organization's existing data management systems instead of being configured as a separate system. This integration may occur by adding an archiving table to an existing database of the organization containing data that is to be archived. The archiving table may include multiple records, each record storing a binary large object representing a complete, self-contained archive of the organization's data at a preselected time. Incorporating archiving and archived data into the organization's existing data management systems in this manner may eliminate the need for a dedicated archiving system and may eliminate synchronization and interconnectivity issues with an independent archiving system.

20 Claims, 3 Drawing Sheets

EMBEDDING ARCHIVED DATA IN A DATA SOURCE

BACKGROUND

Archiving tools have been used to preserve copies of electronic data in an organization at different instances. Archiving provided organizations with the ability to go back in time and identify a configuration of a computing system and/or the data stored on the system when the archive was created. Organizations have used archiving both to preserve electronic data and to comply with rules, regulations, and other legal obligations.

In the past, when archives were created, a copy of organization data would be exported or otherwise copied to an external archiving system. The archiving system was a separate and independent system from the other systems of the organization containing the data that was to be archived. The archiving system included its own storage medium for storing each of the archived copies of the organizational data created at different instances. This archiving storage medium was separate and independent from the storage medium used to the organizational data that was being archived.

Synchronization problems occurred between the different storage media. For example, during a data backup procedure, the different storage media were backed up at different times and/or at different rates. As a result, the backed up data varied from the archived data. For example, when the archiving and backing up occurred at different rates and at least partially overlapped with each other, the contents of the backed up and archived data would likely vary from each other. Additionally, in some instances separate and independent backup systems were needed for archiving as well as backing up the archives in the archiving system. These separate backup systems required additional maintenance and resources to set up, operate, and manage.

There is a need for an integrated archiving system that eliminates the need for separate archiving and/or backup systems requiring additional resources to set up, operate, and maintain.

DETAILED DESCRIPTION

Figure 1:
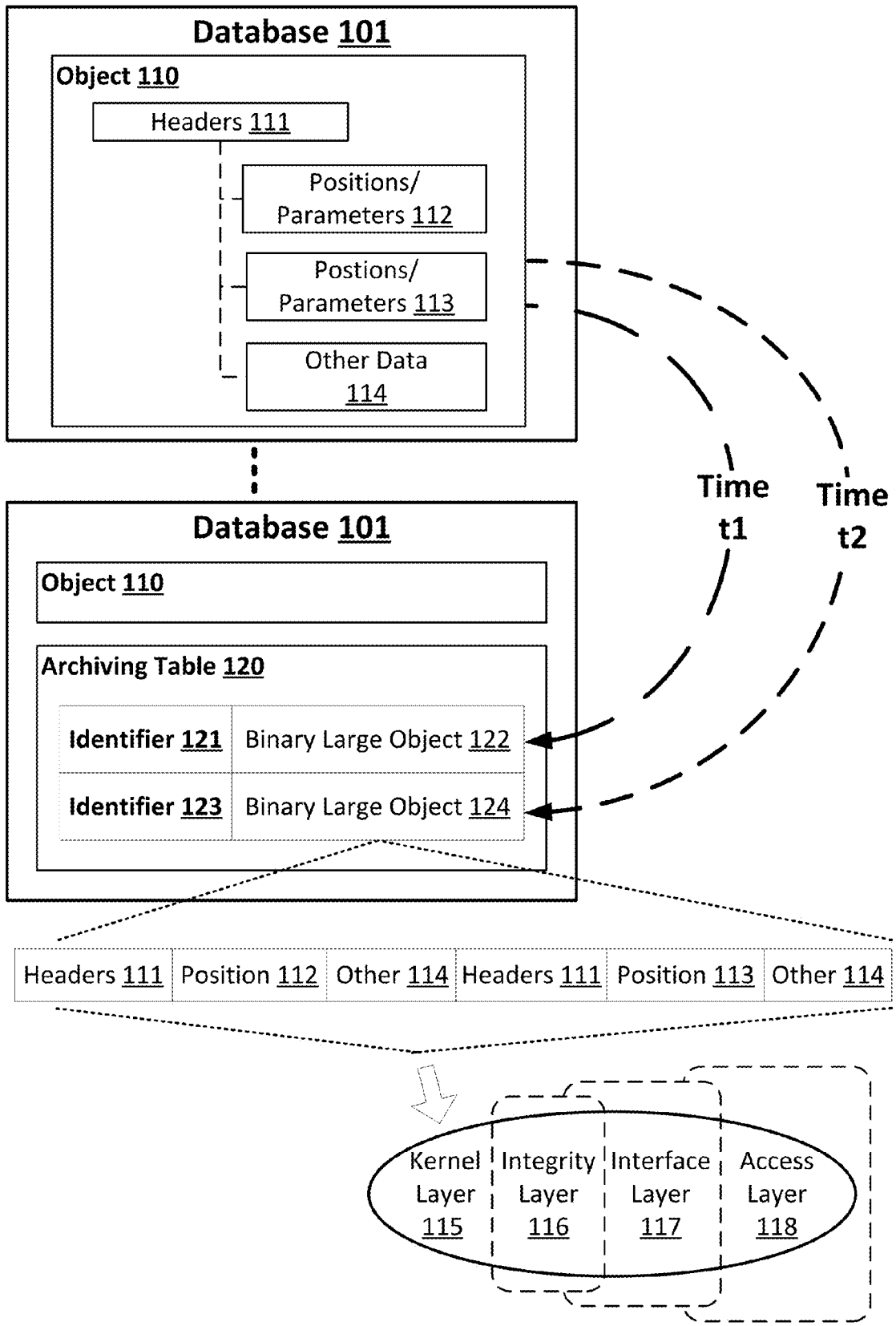
FIG. 1 shows an exemplary database configuration in an embodiment.

Archiving may be integrated into an organization's existing data management systems instead of being configured as a separate system. This integration may occur by adding an archiving table in an existing database of the organization containing data that is to be archived. The archiving table may include different fields including an identifier field and a field suitable for storing a binary large object. The archiving table may include multiple records, each record representing a complete, self-contained archive of the organization's data at a preselected time.

A binary large object is a collection of binary data stored as a single entity in a database or database management system. The binary large object field in the archiving table may be used to store the archived data. The identifier field in the archiving table may include an identifier of the archived data stored in the associated binary large object field. The identifier may, for example, identify a time that the archive was performed or include another unique value associated with the binary large object.

Incorporating archiving and archived data into the organization's existing data management systems as an additional archive table in a database containing data to be archived may eliminate the need for a dedicated archiving system and may eliminate synchronization issues between the database updates and archiving processes. For example, in an integrated system, when a database back up is to be performed, the entire database may be backed up. Thus, both the current organizational data included in the database as well as the archived binary large objects and other data in the archiving tables may be backed up together as part of a single scheduled back up of the entire database.

Additionally, if the database is later moved or integrated into another system, the archived data will be moved with the rest of the organizational data included in the database, eliminating the need to resynchronize or reintegrate a separate archiving system. Adding the archived data to the existing database containing at least some, if not all of, the data that is to be archived may also provide for seamless access to the archived data for comparison or other purposes. When the archived data is stored in the same database as the existing data, the archiving table can be readily accessed from the same database containing current versions of the data. This eliminates the need to provide, support, and update connectivity and interoperability between the system containing the database and a separate archiving system as the systems are upgraded, moved, or otherwise changed.

To reduce the cost and expense associated with the including the archiving table in the existing database, the memory allocated to the database may be split into at least two types of memory. A first memory type may include a cache, volatile random access memory, or other high throughput memory component. The first memory type, which may be more expensive than the second type discussed below, may be used to store the current data of the organization that is to be archived.

The second memory type may include slower, non-volatile memory that is less expensive than the first memory type. The slower, non-volatile memory may include but is not limited to read-only memory; flash memory; magnetic computer storage devices such as hard disks, floppy disks, and magnetic tape; and optical discs. The second memory type may be used to store the archiving table data including the binary large objects storing archived copies of the database. The archived data may be accessed less frequently than the current organizational data in the database, so some organizations may be willing to use slower non-volatile memory to reduce storage expenses for storing different archived copies of data recorded at different times.

FIG. 1 shows an exemplary database 101 configuration in an embodiment. Database 101 may include one or more objects 110 containing stored data. Object 110 may include one or more tables, arrays, records, fields, and/or other data structures that store data for an entity. The data stored in object 110 may be organized hierarchically according to a hierarchical database model. The hierarchical organization may include tree-like structures based on parent-child relationships in which each parent may have one or more children. Each child may have only one parent.

Each object 110 may include a set of parent headers 111 and a set of child nodes, which may include one or more positions or parameters 112 and 113 of the object 110 and/or other data 114. The headers 111 may include data is that valid for the entire object 110. Although FIG. 1 shows a single parent header 111 which three child nodes 112, 113, and 114, different objects may include more complex or simpler tree structures with multiple nested levels and/or branches.

An organization may schedule periodic or intermittent archiving of data included in database 101, such as at time t1 and t2. At time t1, the data in database 101 identified for archiving, such as object 110 may be copied and restructured into a binary large object format. In some instances, the original data, such as object 110, that is copied may be deleted from the database 101, such that the data is exclusively stored in the restructured binary large object format and no longer in the database 101. In some instances the data may be deleted from the database around the time it is being stored in the binary large object format though in other instances the data may be deleted later after the copying into the binary large object format is complete. The copied data may be reorganized from a hierarchical data model in the database 101 into a continuous linear sequence of the individual data components (such as headers 111, parameters 112 and 113, and other data 114) included in the database 101 for archiving. The continuous linear sequence may be incorporated into a binary large object 122 for the data copied at time t1 and binary large object 124 for the data copied at time t2.

In some instances, the restructuring may include taking the header 111 in an object 110 and identifying each of the child parameter nodes 112 and 113. The header 111 may then be included in the linear sequence before each identified child parameter node 112 and 113. After each child parameter node 112 and 113 and before the header 111 associated with the next child parameter node 112 and 113 other non-parameter data 114 may be included in the linear sequence. Thus, for the object 110 shown in FIG. 1, the continuous linear data sequence of binary large objects 122 and 124 may include header data 111 followed by position/parameter data 112 followed by other data 114 followed by header data 111 followed by position/parameter 113 followed by other data 114 and so on.

In addition, in some instances at least some of the data included in the binary large objects 122 and 124 of archiving table 120 may be arranged in one or more layers 115 to 118. A first kernel layer 115 may include data inherent to the database 101. In some instances the kernel layer 115 may be included in one or more headers 111. A second integrity layer 116 may include one or more business rules defining a business process associated with at least some of the archived data. For example, if the object 110 relates to purchasing order then the integrity layer 116 may include logic rules for a processing device to follow before issuing or authorizing a purchase order. A third interface layer 117 may define an implementation of at least some of the data being archived. The implementation may include a method for accessing, displaying, entering, or modifying data included in the database 101. The implementation may also define a structure for data included in the database 101 so that other objects and programs can access and/or properly use the data. A fourth access layer 118 may also define technologies permitted to obtain external access to the data in the database 101. The defined technologies may include, but are not limited to a component object model and/or a distributed object model.

Each binary large object 122 and 124 that is created may be stored in an archiving table 120. The archiving table 120 may be separate data structure included in the database 101. Each binary large object 112 and 124 may be stored in the archiving table 120 with a respective identifier 121 and 123 enabling the binary large object 122 and 124 to be subsequently identified. The identifier 121 and 123 may include information about the time that the data in the respective binary large object 122 and 124 was archived or other identifying information enabling future identification of one or more particular binary large objects 122 or 124 to access data from a particular archive.

Figure 2:
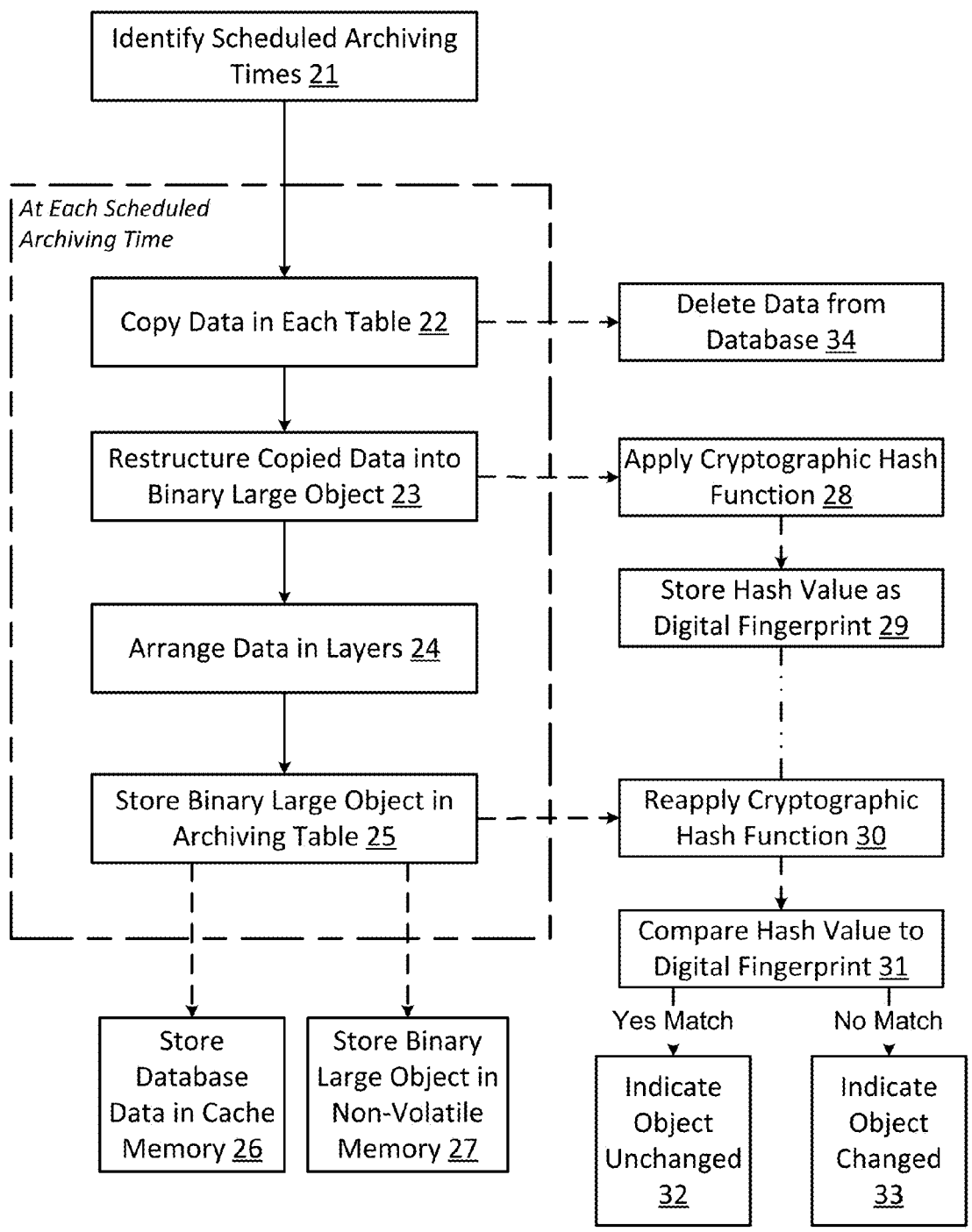
FIG. 2 shows exemplary processes in different embodiments.

FIG. 2 shows exemplary processes. A processing device may be configured to execute one or more features of the processes described herein. In some instances, a non-transitory computer readable medium may store instructions, that when executed by a processing device, cause the processing device to perform the processes described herein.

In box 21, two or more scheduled archiving times for data in a database may be identified. The data in the database may include tables storing data according to a hierarchical data model.

Boxes 22 to 25 may occur or be performed at each scheduled database archiving time. In box 22, the data included in each table in the database that is to be archived may be copied. In some instances, such as in box 34, the data that is copied in box 22 may be deleted from the database at about the time the data is copied or thereafter.

In box 23, the copied data from the hierarchical data model may be restructured into a binary large object structured as a single entity using a processing device. In box 28, a cryptographic hash function may be applied to at least one of the binary large objects and at least one identifier associated with the binary large object. In box 29, an output of the applied cryptographic hash function may be stored as a digital fingerprint of the at least one respective binary large object and the at least one respective identifier.

In box 24, at least some of the data in the binary large object may be arranged in a plurality of layers using the processing device. In some instance, during the arranging into layers in box 24, an existing business object format of the at least some of the copied data may be at least partially preserved. In some instances, at least some of the copied data may be rearranged into the plurality of the layers.

The layers may include a core layer with a kernel. The kernel may include data inherent to the database.

A second layer may include business rules applied to at least some data in the binary large object. The business rules may include logic representing a process associated with at least some of the copied data.

A third layer may define an interface for the at least some data in the binary large object with respect to an external object, program or system. The defined interface may define an implementation of at least some of the copied data. The defined interface may, for at least some of the copied data, define a structure of the copied data.

A fourth layer may define technologies permitted to obtain external access to the at least some data. The defined technologies may include a component object model technology.

In box 25, the binary large object may be stored as the single entity in an archiving table of the database with an identifier associating the stored binary large object with the respective scheduled database archiving time. The archiving table may include the stored binary large objects and the identifiers. The identifiers may be searched to identify an archive associated with a selected time corresponding to the search. The binary large object associated with the identified archive may be retrieved from the archiving table. The retrieved binary large object may be searched to retrieve historical data associated with the selected time.

In box 26, a first set of data included the database for archiving may be stored at a first system including a first computer readable medium. The first computer readable memory may be a volatile random access memory.

In box 27, a second set of data in the database including the binary large object containing the archived data may be stored at a second system including a second computer readable medium having a read/write time and a data transfer rate that is less than that of at least one of the first system and the first computer readable medium. The second set of data stored at the second system may include the archiving table. The second computer readable memory may be a non-volatile memory.

In box 30, in those instances where a digital fingerprint has been stored as in box 29, and responsive to a request to verify an authenticity of the at least one of the binary large objects, the cryptographic hash function in box 28 may be reapplied to the respective at least one binary large object and the respective at least one identifier.

In box 31, an output of the reapplied cryptographic hash function may be compared to the digital fingerprint. In box 32, an indication that at least one of the respective binary large objects is unchanged may be generated when the output of the reapplied cryptographic hash function matches the digital fingerprint during the comparing in box 31. In box 33, an indication that at least one of the respective binary large objects has been changed may be generated when the output of the reapplied cryptographic hash function does not match the digital fingerprint during the comparing in box 31.

In some instances, the cryptographic hash function may be separately applied to each binary large object and each respective identifier. The output of each separately applied hash function may be stored as the digital fingerprint for the respective binary large object.

Figure 3:
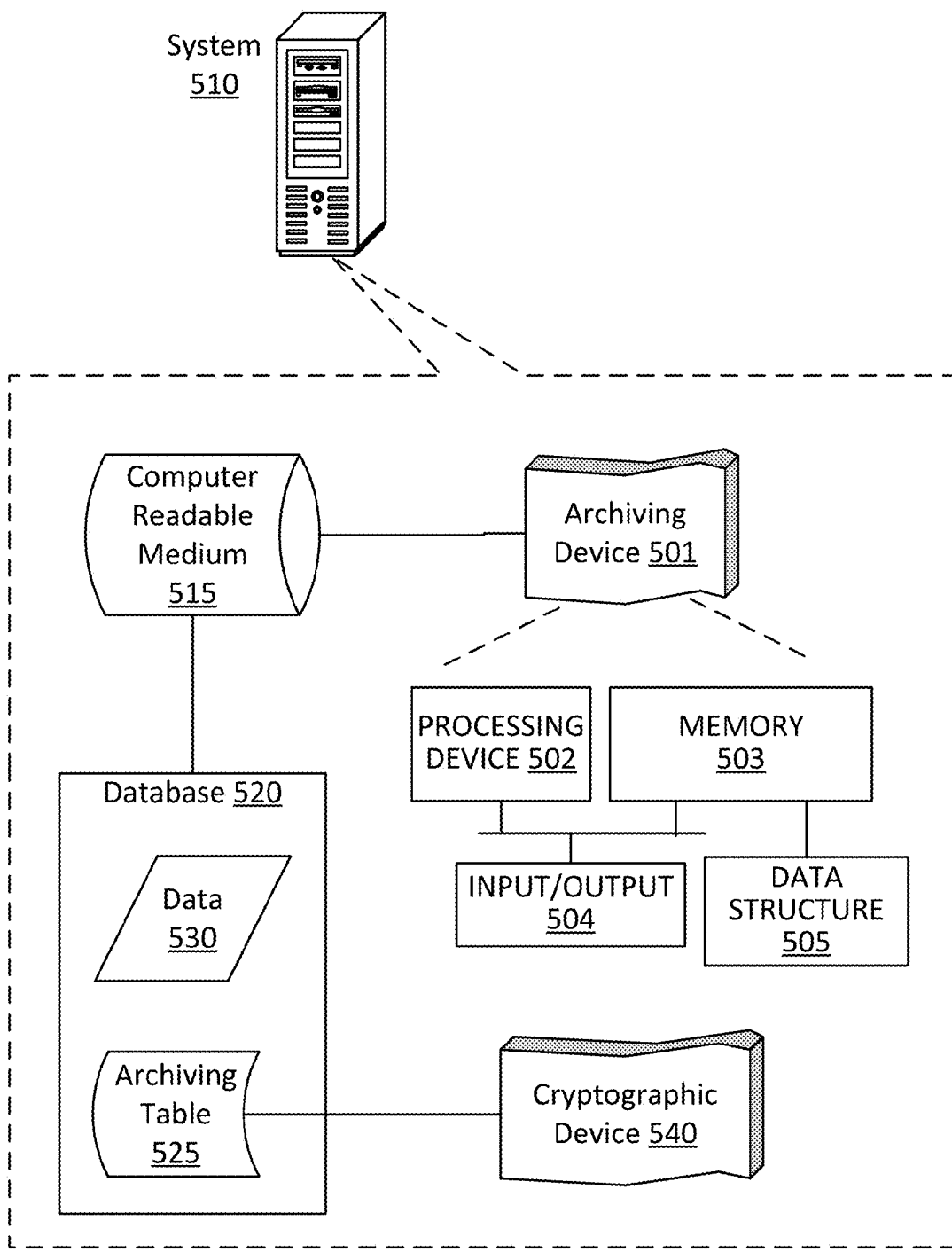
FIG. 3 shows an exemplary architecture in an embodiment.

FIG. 3 shows an exemplary architecture. System 510 may include an archiving device 501, a non-transitory computer readable medium 515, and/or a cryptographic device 540. Computer readable medium 515 may store a database 520 containing both data 530 to be archived and an archiving table 525 containing archived copied of the data 530. Database 520 may include tables in a hierarchical data model.

The archiving device 501 may include a processing device 502, memory 503 storing loaded data or a loaded data structure 505, and an input/output interface 504, all of which may be interconnected via a system bus. The archiving device 501 may be configured to identify a plurality of scheduled archiving times for archiving the data 530 in the database 520. At each scheduled database archiving time, the archiving device 501 may copy the data 530 included in each table in the database 520, restructure the copied data 530 from the hierarchical data model into a binary large object structured as a single entity, and arrange at least some of the data in the binary large object in layers. The layers may include a core layer including a kernel, a second layer including business rules applied to at least some data in the binary large object, a third layer defining an interface for the at least some data in the binary large object with respect to an external object, program or system, and a fourth layer defining technologies permitted to obtain external access to the at least some data. The archiving system 501 may store the binary large object as the single entity in an archiving table of the database with an identifier associating the stored binary large object with the respective scheduled database archiving time.

The cryptographic device 540 may configured to separately apply a cryptographic hash function to each binary large object and each respective identifier and output each separately applied hash function as a digital fingerprint for the respective binary large object. The cryptographic device 540 may also be configured to, responsive to a request to verify an authenticity of at least one of the binary large objects, reapply the cryptographic hash function to the at least one of the binary large objects and/or one or more respective identifiers. The cryptographic device 540 may compare an output of the reapplied cryptographic hash function to the digital fingerprint. The cryptographic device 540 may indicate that the at least one of the binary large objects is unchanged when the output of the reapplied cryptographic hash function matches the digital fingerprint. The cryptographic device 540 may indicate that the at least one of the binary large objects has been changed when the output of the reapplied cryptographic hash function does not match the digital fingerprint.

System 510 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 503 may contain different components for retrieving, presenting, changing, and saving data and may include the computer readable medium 515. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the system 510 is shown as a single integrated system, in some instances the functionality in system 510 may be distributed over two or more systems that are configured to appear as a functionally integrated single system.

We claim:

1. A method comprising:
   identifying a plurality of scheduled archiving times for a database including tables storing data according to a hierarchical data model, wherein one of the tables is an archiving table;
   at each scheduled database archiving time:
   identifying data to be archived corresponding to the respective scheduled database archiving time;

copying the identified data included in each table in the database;

restructuring, using a processing device, the copied data from the hierarchical data model into a binary large object structured as a single entity by reorganizing the copied data into a continuous linear sequence of components within the copied data from the hierarchical data model;

arranging, using the processing device, at least some of the data in the binary large object in a plurality of layers including:
  a core layer including a kernel;
  a second layer including business rules applied to at least some data in the binary large object;
  a third layer defining an interface for the at least some data in the binary large object with respect to an external object, program or system; and
  a fourth layer defining technologies permitted to obtain external access to the at least some data; and storing the binary large object as the single entity in an archiving table of the database including the data to be archived with an identifier associating the stored binary large object with the respective scheduled database archiving time.

2. The method of claim 1, wherein the arranging the at least some data in the plurality of layers includes at least partially preserving an existing business object format of the at least some data.

3. The method of claim 1, wherein the arranging the at least some data in the plurality of layers includes at least some rearranging of the at least some data.

4. The method of claim 1, wherein the kernel includes data inherent to the database.

5. The method of claim 1, wherein the business rules include logic representing a process associated with the at least some data.

6. The method of claim 1, wherein the defined interface for the at least some data defines an implementation of the at least some data.

7. The method of claim 6, wherein the defined interface for the at least some data defines a structure of the at least some data.

8. The method of claim 1, wherein the defined technologies includes a component object model technology.

9. The method of claim 1, wherein the archiving table includes the binary large objects and the identifiers associated with each of the scheduled archiving times, and further comprising:
  searching the identifiers to identify an archive associated with a selected time;
  retrieving the binary large object associated with the identified archive from the archiving table; and
  searching the retrieved binary large object to retrieve historical data associated with the selected time.

10. The method of claim 1, further comprising:
  storing a first set of data in the database at a first system including a first computer readable medium; and
  storing a second set of data in the database including the binary large object at a second system including a second computer readable medium having a read/write time and a data transfer rate that is less than that of at least one of the first system and the first computer readable medium.

11. The method of claim 10, wherein the second set of data includes the archiving table.

12. The method of claim 10, wherein the first computer readable memory is a cache and the second computer readable memory is a non-volatile memory.

13. The method of claim 1, further comprising:
  applying a cryptographic hash function to at least one of the binary large objects and at least one of the respective identifiers;
  storing an output of the applied cryptographic hash function as a digital fingerprint of the at least one of the binary large objects and the at least one of the respective identifiers.

14. The method of claim 13, further comprising:
  responsive to a request to verify an authenticity of the at least one of the binary large objects, reapplying the cryptographic hash function to the at least one of the binary large objects and the at least one of the respective identifiers;
  comparing an output of the reapplying cryptographic hash function to the digital fingerprint;
  indicating that the at least one of the binary large objects is unchanged when the output of the reapplied cryptographic hash function matches the digital fingerprint; and
  indicating that the at least one of the binary large objects has been changed when the output of the reapplied cryptographic hash function does not match the digital fingerprint.

15. The method of claim 13, further comprising:
  separately applying the cryptographic hash function to each binary large object and each respective identifier; and storing the output of each separately applied hash function as the digital fingerprint for the respective binary large object.

16. A device comprising a non-transitory computer readable medium storing instruction that, when executed by a processing device, cause the processing device to:
  identify a plurality of scheduled archiving times for a database including tables storing data according to a hierarchical data model, wherein one of the tables is an archiving table;
  at each scheduled database archiving time:
    identify data to be archived corresponding to the respective scheduled database archiving time;
    copy the identified data included in each table in the database;
    restructure the copied data from the hierarchical data model into a binary large object structured as a single entity by reorganizing the copied data into a continuous linear sequence of components within the copied data from the hierarchical data model;
    arrange at least some of the data in the binary large object in a plurality of layers including: a core layer including a kernel;
    a second layer including business rules applied to at least some data in the binary large object;
    a third layer defining an interface for the at least some data in the binary large object with respect to an external object, program or system; and
    a fourth layer defining technologies permitted to obtain external access to the at least some data; and
  store the binary large object as the single entity in an archiving table of the database including the data to be archived with an identifier associating the stored binary large object with the respective scheduled database archiving time.

17. The device of claim 16, wherein the kernel includes data inherent to the database, the business rules include logic representing a process associated with the at least some data, the defined interface for the at least some data defines an implementation of the at least some data, the defined interface for the at least some data defines a structure of the at least some data, and the defined technologies includes a component object model technology.

18. A system comprising:
a non-transitory computer readable medium storing a database including tables in a hierarchical data model; and
an archiving device including at least one processing device, the archiving device configured to:
identify a plurality of scheduled archiving times for the database;
at each scheduled database archiving time:
identify data to be archived corresponding to the respective scheduled database archiving time;
copy the identified data included in each table in the database;
restructure the copied data from the hierarchical data model into a binary large object structured as a single entity by reorganizing the copied data into a continuous linear sequence of components within the copied data from the hierarchical data model;
arrange at least some of the data in the binary large object in a plurality of layers including:
a core layer including a kernel;
a second layer including business rules applied to at least some data in the binary large object;
a third layer defining an interface for the at least some data in the binary large object with respect to an external object, program or system; and
a fourth layer defining technologies permitted to obtain external access to the at least some data; and
store the binary large object as the single entity in an archiving table of the database including the data to be archived with an identifier associating the stored binary large object with the respective scheduled database archiving time.

19. The system of claim 18, further comprising a cryptographic device configured to:
separately apply a cryptographic hash function to each binary large object and each respective identifier; and
output each separately applied hash function as a digital fingerprint for the respective binary large object.

20. The system of claim 19, wherein the cryptographic device is further configured to responsive to a request to verify an authenticity of at least one of the binary large objects, reapply the cryptographic hash function to the at least one of the binary large objects and one or more respective identifiers;
compare an output of the reapplied cryptographic hash function to the digital fingerprint;
indicate that the at least one of the binary large objects is unchanged when the output of the reapplied cryptographic hash function matches the digital fingerprint; and
indicate that the at least one of the binary large objects has been changed when the output of the reapplied cryptographic hash function does not match the digital fingerprint.

* * * * *